United States Patent [19]

Ridley et al.

[11] Patent Number: 5,406,470
[45] Date of Patent: Apr. 11, 1995

[54] AC/DC CONVERTER

[75] Inventors: Ray Ridley, Battle Creek, Mich.; Siegfried Kern, Freiamt, Germany

[73] Assignee: FRAKO, Kondensatoren-und Apparatebau GmbH, Teningen, Germany

[21] Appl. No.: 35,650

[22] Filed: Mar. 23, 1993

[30] Foreign Application Priority Data

Mar. 27, 1992 [CH] Switzerland .................. 00991/92

[51] Int. Cl.$^6$ ........................................... H02M 7/155
[52] U.S. Cl. ........................................ 363/69; 363/46; 363/53; 363/87; 363/126; 323/207
[58] Field of Search .................. 363/85, 89, 37, 39, 363/44, 46, 52-54, 69, 67, 84, 87, 81, 125, 126; 323/207; 361/88, 90, 91, 111

[56] References Cited

U.S. PATENT DOCUMENTS

| 3,047,848 | 3/1957 | Johnson | 340/250 |
| 4,285,023 | 8/1981 | Kalivas | 361/91 |
| 4,992,921 | 2/1991 | Albach et al. | 363/44 |
| 5,003,453 | 3/1991 | Tighe et al. | 363/65 |
| 5,045,991 | 9/1991 | Dhyanchand et al. | 363/89 |

Primary Examiner—Steven L. Stephan
Assistant Examiner—Adolf Berhane
Attorney, Agent, or Firm—McAulay Fisher Nissen Goldberg & Kiel

[57] ABSTRACT

An AC/DC converter is provided for connecting to conductors of a multi-phased alternating current generator or network, which is built redundantly for protection against a total loss and which loads the AC generator essentially without non-linear distortion and where several power factor correction circuits, arranged in parallel with one another, are provided. A number of rectifier circuits are included which are independent of each other and equal to the number of phases of the generator. Each rectifier circuit has six rectifier elements which are connected in pairs to terminals of the generator and, by the formation of bridges, are commonly connected to the output conductors of the rectifier circuits. Each rectifier circuit is connected to a one phase power correction circuit. At least one switch is provided for each rectifier circuit. The switch or switches are associated with at least one pair of rectifier elements and are used to always separate associated pairs of rectifier elements from the conductors associated with the generator. Sensors are included for the functional control of the phases of the generator and the one phase power factor circuits. A switch control logic circuit is connected through conductors with the sensors and which, based on the signals from the sensors, closes or opens the switches of the rectifier circuits.

15 Claims, 2 Drawing Sheets

AC/DC CONVERTER

BACKGROUND OF THE INVENTION a) Field of the Invention

The invention is about an AC/DC converter for connection to a multi-phase AC network. Additionally it concerns a method relating to this technical area.

b) Background Art

AC/DC converters for connection to a multi-phase network are known. For example, U.S. Pat. No. 5,045,991 discloses such a converter which, with the aid of a six-pulse controlled bridge rectifier, rectifies a 3 phase AC current.

DE Patent 37 38 181 A1 discloses a similar arrangement in which a current rectifier has an output DC current which is controlled by a steady in phase switching of six bridge rectifier elements. The difference between the two patents is in the control logic where, especially in the first mentioned patent, the alternative current of the network remains approximately sinusoidal even under varying load.

U.S. Pat. No. 5,003,453 discloses an additional AC/DC converter with loading of the three phases of a 3 phase network. This converter feeds, in one version with all three phases and in another version with a single one of the three phases of the network, three parallel power factor correction circuits. These supply at their outputs DC current which is then changed again through a DC/DC converter for the various loads requested by a computer complex. The AC/DC converter is built multiply redundant and is able, during interruption of a network phase, or a power factor correction circuit, or a DC/DC converter, to deliver the current that is required by the computer. This AC/DC converter is quite complicated and is. especially built to deliver the diverse loads of a large scale computer, and the computer operation is not interrupted even when the converter needs to be worked on or repaired.

OBJECT AND SUMMARY OF THE INVENTION

A primary object of the invention consists of providing a regulated, redundant AC/DC converter for general usage, which is simple in its structure and which is secure in its current delivery capability despite considerable interruptions. Also it should be flexible with respect to its output values.

In accordance with the invention, in an AC/DC converter for connecting to conductors of a multiphased alternating current generator or network, which is built redundantly as a means of protection against a total loss and which loads the AC generator essentially without non-linear distortion and where several power factor correction circuits arranged in parallel with one another are provided, the improvement comprising: a number of rectifier circuits independent of each other and equal to the number of phases of the generator. Each rectifier circuit has six rectifier elements which are connected in pairs to conductors of the generator and by the formation of bridges are commonly connected to output conductors of the rectifier circuits. Each rectifier circuit is connected to a one phase power correction circuit. At least one switch is provided for each rectifier circuit. The switch or switches are associated with at least one pair of rectifier elements and are used to always separate associated pairs of rectifier elements from the conductors associated with the generator. Sensors are provided for the functional control of the phases of the generator and the one phase power factor circuits. A switch control logic circuit is connected through conductors with the sensors, which based on the signals from the sensors, closes or opens the switch or switches of the rectifier circuits.

For a better understanding of the present invention, reference is made to the following description and accompanying drawings while the scope of the invention will be pointed out in the appended claims.

BRIEF DESCRIPTION OF THE DRAWINGS

The invention is described in more details in the schematic diagrams as follows.

DESCRIPTION OF THE PREFERRED EMBODIMENTS

Figure 1:
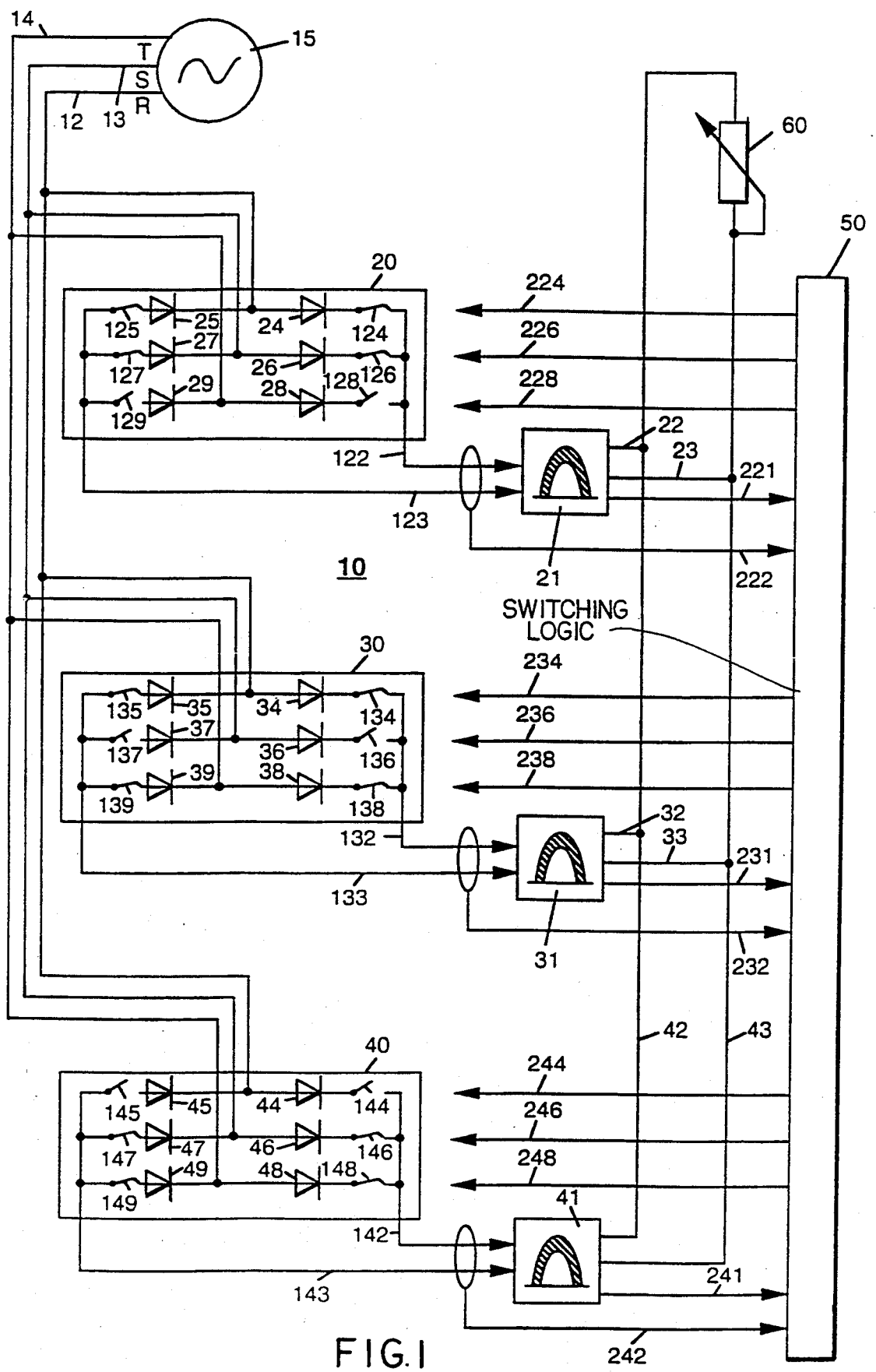
FIG. 1—Schematic block diagram of an AC/DC converter for connection to a three phase network in accordance with the invention.

FIG. 1 shows a block diagram of an AC/DC converter 10. This converter 10 is connected to the three phases 12, 13, 14 of a three-phase network which is represented by the generator 15. Each of the three phases 12, 13, 14 connects to a three phase network with phases R, S, T. A neutral phase is not necessary and therefore not shown.

The phases 12, 13, 14 are connected on the primary side and in parallel to three rectifier circuits 20, 30, 40. Each of the rectifier circuits connects to a one phase power factor correction unit 21, 31 and 41 respectively.

The outputs 22, 23, 32, 33, 42, 43 of these units 21, 31, 41 are connected together to a variable load 60, represented as an ohmic resistor. The AC/DC converter 10 consists further of a control and switch logic 50 which is connected with the DC rectifier circuits 20, 30, 40 and the power factor correction units 21, 31, 41.

The three rectifier circuits 20, 30, 40 are identical in structure and each contain six rectifiers shown as six diodes 24–29, 34–39, and 44–49. Each of the diodes are serially associated with a switch 124–129, 134–139, 144–149. The diodes and switches of each rectifier circuit 20, 30, 40 are connected in a six-pulse controlled bridge rectifier in pairs to the conductors 12, 13, 14 and in threes to connections 122, 123, 132, 133, 142, 143 going to the power factor correction units 21, 31, 41.

In a normal case, i.e. defect free operation, two pairs of switches 124–129, 134–139, 144–149 are closed (i.e. switched for current conduction) in each rectifier circuit 20, 30, 40 and the remaining two switches are open (i.e. no current conduction). The open and closed switches are chosen in such a way that in each rectifier circuit 20, 30, 40 a different open switch is assigned to the conductors 12, 13, 14. In FIG. 1 for example, the pair of switches 128, 129 in the rectifier circuit 20 are open and assigned to conductor 14, the pair of switches 136, 137 in the rectifier circuit 30 are open and assigned to conductor 13, and the pair of switches 144, 145 in the rectifier circuit 40 are open and assigned to conductor 12. All other switches are closed. With this arrangement each rectifier circuit 20, 30, 40 works as a one phase bridge rectifier that is assigned to one of the phases R, S, T of the three phase AC current. At the connections 122, 123, 132, 133, 142, 143 to the power factor correction units 21, 31, 41, the voltage has been derived from one phase rectification of a quasi sinusoidal waveform.

The three one-phase power factor correction units 21, 31, 41 are identical and work independent from each other. Each one of those units 21, 31, 41 delivers at its outputs 22, 23, 32, 33, 42, 43, respectively, a regulated DC current at any adjustable output voltage. The units are built in such a way that the described one phase pulsing rectified voltages at the inputs 122, 123, 132, 133, 142, 143 are used largely without nonlinear distortion. The load on the generator 15 (i.e. The AC network) has characteristics similar to that of an ohmic load. Accordingly, conductors 12, 13, 14 are essentially free of higher harmonics which could cause interference with other equipment. Such a power factor correction unit is described, e.g., in the European patent 0218 267.

Further characteristics of the one-phase power factor correction units 21, 31, 41 include the galvanic separation between input and output as well as the dimensional output. The galvanic separation is the reason why, as described, the outputs 22, 23, 32, 33, 42, 43 can be connected together at any potential. The dimensional output can be made in such a way that two of the three units 21, 31, 41 always are able to provide the maximum power. Therefore, in the case of a failure of any one of the units 21, 31, 41, there is no loss of power at the output or the load 60.

The control and switching logic 50 controls the switches 124–129, 134–139, 144–149, of the rectifier circuits 20, 30, 40 commonly and in pairs in the closed or open state via the corresponding control signal conductors 224, 226, 228, 234, 236, 238, 244, 246, 248. The control signal information is fed via signal conductors 222, 232, 242, for example, from the connections 122, 123, 132, 133, 142, 143 and over conductors 221, 231, 241 from the power factor correction units 21, 31, 41.

The AC/DC converter 10 works as follows: During defect free, normal operation, each rectifier circuit 20, 30, 40, acting as a four pole bridge rectifier, rectifies the alternating current, which is sinusoidal, and which is derived through the changing phases R, S, T of the three phase alternating current, according to triangle or delta connection. There is no need for the switches 124–129, 134–139, 144–149 to operate. They remain in the described normal position. The power factor correction units 21, 31, 41 produce a regulated direct current of a high quality from the accordingly generated one-phase pulsing rectifier current. The three units deliver the power required by the load essentially in equal parts.

If for any reason one of the power factor correction units 21, 31, 41 fails, then this condition is transmitted to the control and switching logic 50 via the corresponding signal conductors 221, 231, 241. The control and switching logic reacts by opening all switches of the corresponding rectifier circuit 20, 30, 40 thereby disconnecting the failing branch of the converter 10 from the generator 15 or from the AC network. The remaining two power factor correction units 21, 31, 41 will now automatically increase their power output thereby continuing to deliver to the load 60 an unchanged current.

If one of the phases R, S, T of the generator 15 breaks down, then this condition will be transmitted to the control and switching logic over at least one of the signal conductors 222, 232, 242. In this case the logic 50 closes all previously open switches of all three rectifier circuits 20, 30, 40, enabling an emergency operation. The remaining voltages between lines 12, 13, 14 are still essentially sinusoidal so that all rectifier circuits 20, 30, 40 and the allocated power factor correction units 21, 31, 41 operate essentially unchanged. In this case, the rectifier diodes provide the necessary decoupling. In order to improve the decoupling, the logic 50 may open those switches being associated with the phase R, S, T down.

In its described construction, the AC/DC converter 10 possesses redundancy which in cases of disturbances can be used. By this, a mostly secure supply of current to the load 60 is guaranteed.

Figure 2:
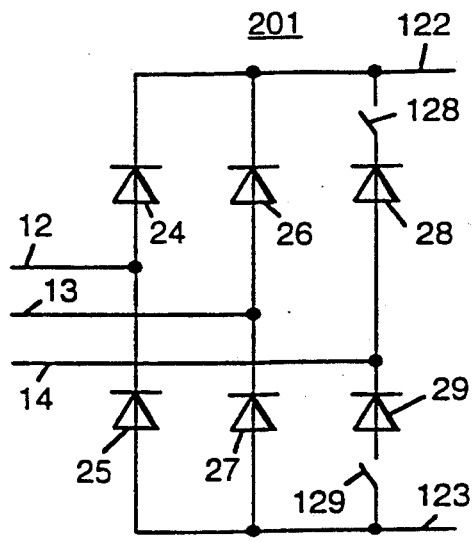
FIG. 2—First variation of a schematic diagram of a rectifier circuit in accordance with the invention.

Further embodiments of the AC/DC converter 10 will be described in the following. FIG. 2 shows a second rectifier circuit 201 which may substitute for the described rectifier circuits 20, 30, 40. This second circuit 201 contains unchanged six diodes 24–29, but only two switches 128, 129, which are associated with the pair of the diodes 28, 29. These switches, in this example associated with conductor 14, will be open during normal, uninterrupted operation and will be closed if one of the phases R, S, T breaks down.

Figure 3:
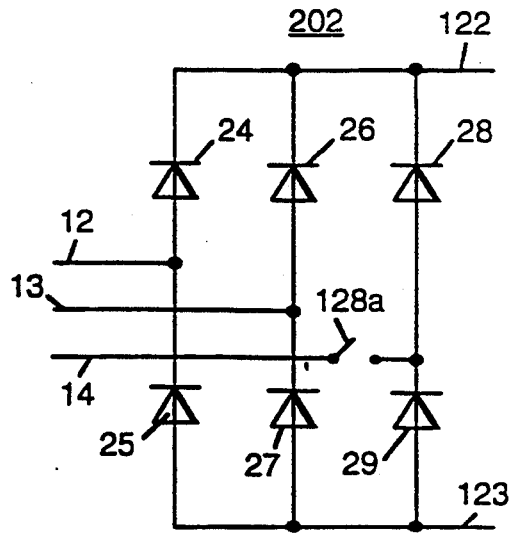
FIG. 3—Second variation of a schematic diagram of a rectifier circuit in accordance with the invention.

FIG. 3 shows a third embodiment 202 of the rectifier circuit. It has only a single switch 128a. This switch 128a is associated with diodes 28, 29 and connected to conductor 14. This switch functionally replaces the two switches 128, 129 of the embodiment according to FIG. 2.

In principle, switches 124–129, 134–139, 144–149, 128a can be electromechanical switches, e.g. The contacts of a relay or a contactor since the switches are switched very seldom and there are no special requirements for the actual switching operation, e.g. a requirement that the switching can only take place at zero voltage. However, a preferred solution uses controlled semi-conductors as for example thyristors or triacs. These elements allow the combination of the functions of the diodes and of the switches in a single unit. It is to be seen that, the switches according to FIG. 1 and 2 may be unipolar. The switch 128a in FIG. 3, however, must be a bi-polar switch.

Figure 4:
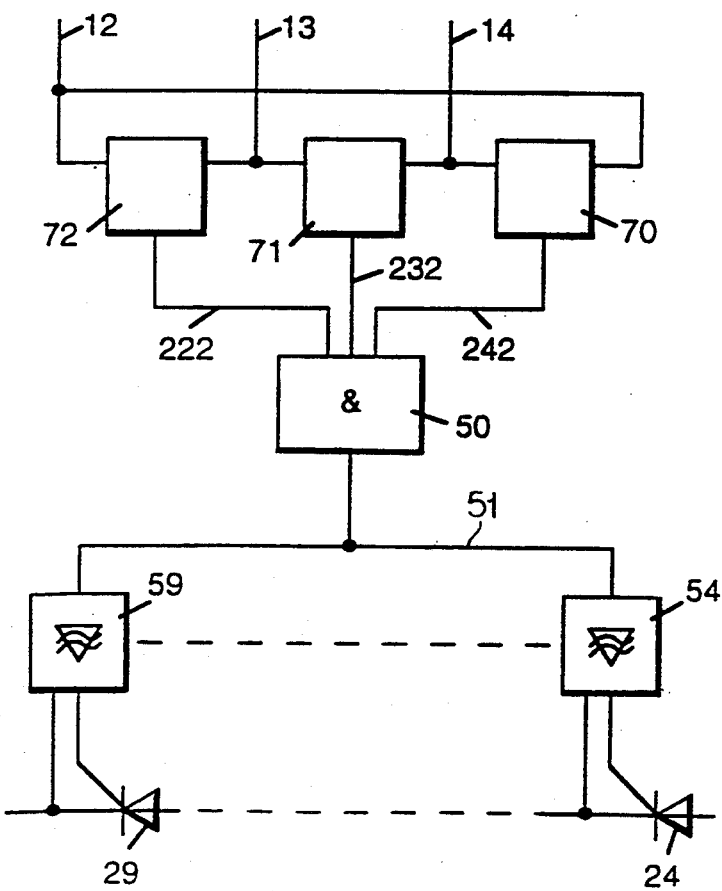
FIG. 4—Schematic block diagram of a control arrangement in accordance with the invention.

FIG. 4 illustrates a block diagram of a simple controller for phases R, S, T of a three-phase AC generator 15 as well as the associated switching logic 50. Three voltage controllers 70, 71, 72 serve as sensors which are connected in a triangular or delta fashion to the conductors 12, 13, 14. The switching logic 50 is made of a logical AND with an inverted output 51. This output directly controls, via the amplifiers 54, 59, thyristors which represent the switches 24–29.

As a power factor correction unit 21, 31, 41, basically any kind of converter is usable that produces a direct current from a rectified sinusoidal alternating current. However, no linear distortions are allowed to be fed back into the resistor 15 and preferably it should provide voltage decoupling. Such a known converter is described in the European patent 0 218 267. There the voltage decoupling is achieved through a controlled bridge switch followed by a transformer and rectifier. It is advantageous when the power factor correction units 21, 31, 41 are built as boost/buck cells because in this way the flexibility of the ratio input voltage (i.e. voltage between conductors 12, 13, 14) to output voltage (i.e. voltage between outputs 22, 23, 32, 33, 42, 43) can be made very large.

The outputs of the power factor correction units 21, 31, 41 can, with appropriate voltage decoupling, be connected to a single load 60. But is also possible that each unit 21, 31, 41 is connected to a separate load. In this case, the loads need not be equal.

The construction of the AC/DC converter 10 is relatively simple and robust. It can be connected to the generator or AC network 15 without a neutral or ground connector. The converter is flexible and adaptable to many special applications. A very significant characteristic is its redundancy and it therefore satisfies the high demands for security against interruptions. The switches described are only operated during a power failure and do not require continuous operation. The converter 10 is therefore a comparatively very useful device for almost any application.

While the foregoing description and drawings represent the preferred embodiments of the present invention, it will be obvious to those skilled in the art that various changes and modifications may be made therein without departing from the true spirit and scope of the present invention.

What is claimed is:

1. In an AC/DC converter for connecting to conductors of a multi-phased AC generator or network, which is built redundantly as a means of protection against a total loss and which loads the AC generator essentially without non-linear distortion, and where several power factor correction circuits arranged in parallel with one another are provided, the improvement comprising:
   a number of rectifier circuits independent of each other and equal to the number of phases of the generator; each rectifier circuit having six rectifier elements which are connected in pairs to conductors of the generator and by bridge arrangement are commonly connected to output conductors of said rectifier circuits; each rectifier circuit being connected to a one phase power factor correction circuit;
   at least one switch being provided for each rectifier circuit, said switch or switches being associated with at least one pair of rectifier elements and being used to always separate associated pairs of rectifier elements from the conductors associated with the generator;
   sensors being provided for the functional control of the phases of the generator and the one phase power factor correction circuits; and
   a switch control logic circuit being connected through conductors with said sensors, and which, based on the signals from the sensors, closes or opens the switches of the rectifier circuits.

2. The AC/DC converter of claim 1, wherein the multi-phase AC generator is a three-phase generator with three phase conductors and having no neutral and no ground conductor.

3. The AC/DC converter of claim 1, wherein for each rectifier circuit, a single switch is provided, said switch being associated with one pair of said rectifier elements; said rectifier elements being associated with one of said conductors of said AC generator.

4. The AC/DC converter of claim 1, wherein, for each rectifier circuit, two switches are provided, said two switches being connected in series with two, paired rectifier elements; said rectifier elements being associated with one of said conductors of said AC generator; said two switches and said rectifier elements of each of said rectifier circuits being associated to a second of said conductors of said AC generator.

5. The AC/DC converter of claim 1, wherein for each rectifier circuit, six switches are provided, each of said switches being connected in series with one of six rectifier elements.

6. The AC/DC converter of claim 1, wherein said switches are electrically controllable semiconductor switches.

7. The AC/DC converter of claim 1, wherein each of said switches together with said corresponding rectifier elements are a single electrically controlled unit.

8. The AC/DC converter of claim 1, wherein each one-phase power factor correction circuit is connected to a separate load.

9. The AC/DC converter of claim 1, wherein each one-phase power factor correction circuit is a converter with galvanic separation, and wherein said one phase power factor correction circuits are connected to a common load.

10. The AC/DC converter in accordance with claim 9, wherein said one phase power factor connection circuits being converters in such a way that one less than the total number of said connectors is sufficient to supply said common load.

11. A method of operating an AC/DC converter having a rectifier circuit including three single switches, each of said single switches being connected to a pair of rectifier elements and having an open position and a dosed position, the pairs of rectifier elements each being connected to one phase of a three phase generator, the method comprising the steps of:
   supplying energy to be convened to said AC/DC converter,
   positioning one of said single switches in the open position during disturbance-free operation and,
   changing the position of said single switches in the open position to the closed position during an interruption.

12. A method of operating an AC/DC converter having three rectifier circuits, each of said rectifier circuits including a pair of switches, each of said pairs of switches being connected to a pair of rectifier elements and having an open position and a closed position, the pairs of rectifier elements each being connected to different phases of a three phase generator, the method comprising the steps of:
   supplying energy to be convened to said AC/DC converter,
   positioning each of said pairs of switches in the open position, and,
   changing the position of said switches in the open position to the closed position during a failure of one of said phases.

13. A method of operating an AC/DC converter having three rectifier circuits, each rectifier circuit having six switches, each of said switches being connected to one of six rectifier elements arranged in pairs and having an open position and a closed position, said pairs being connected to different phases of a three phase generator, the method comprising the steps of:
   supplying energy to be converted to said AC/DC converter,
   positioning four of said switches in each of said rectifier circuits associated with two pairs of the rectifier elements in the closed position and positioning two remaining switches in the open position, selecting said remaining switches in each rectifier circuit whereby said rectifier elements connected to said remaining switches are connected to different phases of the AC generator, and changing the position of said switches in the open position to the closed position during a failure of one of said phases.

14. The method of operating an AC/DC converter according to claim 13, wherein during failure of one of the phases, additionally opening all switches that are associated with the conductor of the failing phase.

15. The method of operating an AC/DC converter in accordance with claim 13, wherein, at the time of the failure of one of the one-phase power factor correction units and for the duration of the failure, opening all switches that belong to the rectifier circuit that is connected to the failing power factor correction unit.

* * * * *